United States Patent
Suomi et al.

(10) Patent No.: US 6,270,628 B1
(45) Date of Patent: Aug. 7, 2001

(54) METHOD FOR DETECTING CONTAMINATION AND/OR DAMAGE IN A FACE RUNNING THROUGH A NIP IN A PAPER MACHINE OR IN A PAPER FINISHING MACHINE

(75) Inventors: Eero Suomi, Hämeenlinna; Tapio Mäenpää, Helsinki; Arto Karjalainen, Kajaani, all of (FI)

(73) Assignee: Valmet Corporation, Helsinki (FI)

( * ) Notice: Subject to any disclaimer, the term of this patent is extended or adjusted under 35 U.S.C. 154(b) by 0 days.

(21) Appl. No.: 09/331,475
(22) PCT Filed: Oct. 19, 1998
(86) PCT No.: PCT/FI98/00813
  § 371 Date: Aug. 12, 1999
  § 102(e) Date: Aug. 12, 1999
(87) PCT Pub. No.: WO99/20836
  PCT Pub. Date: Apr. 29, 1999

(30) Foreign Application Priority Data

Oct. 20, 1997 (FI) .................................................. 974003

(51) Int. Cl.[7] .................................................. D21F 11/00
(52) U.S. Cl. .................................. 162/198; 162/DIG. 10; 162/252; 162/263; 162/262; 162/361; 162/358.1; 162/205; 100/99; 100/161; 100/48
(58) Field of Search .......................... 162/198, DIG. 10, 162/252, 263, 361, 358.1, 205; 100/99, 161, 48

(56) References Cited

U.S. PATENT DOCUMENTS

| | | | |
|---|---|---|---|
| 4,642,164 | 2/1987 | Hanhikoski et al. | 162/207 |
| 5,403,447 | 4/1995 | Järvinen et al. | 162/358.1 |
| 5,603,775 | 2/1997 | Sjöberg | 134/21 |

FOREIGN PATENT DOCUMENTS

| | | | |
|---|---|---|---|
| 4340700 | 6/1995 | (DE) | G01M/7/02 |
| 0075620 | 8/1986 | (EP) | G08C/19/00 |

OTHER PUBLICATIONS

Abstract of FI 914830, p. 3 (1 page).
Article of Jul. 1987 of Tappi Journal No. 7, "Low–frequency vibration analysis of paper machine presses using displacement transducers and the synchronous time–averaging method" by Yvon Phil Gagnon, pp. 49–54.
PCT International Search Report.

*Primary Examiner*—Stanley S. Silverman
*Assistant Examiner*—Mark Halpern
(74) *Attorney, Agent, or Firm*—Steinberg & Raskin, P.C.

(57) ABSTRACT

A method for detecting contamination on or damage to a web-contacting face in a paper machine or a paper finishing machine, including the steps of detecting vibrations of the web-contacting face over a period of time by means of a plurality of detectors arranged in association with the machine and determining the location of the contamination on or damage to the web-contacting face based on the time the vibrations were detected.

20 Claims, 3 Drawing Sheets

METHOD FOR DETECTING CONTAMINATION AND/OR DAMAGE IN A FACE RUNNING THROUGH A NIP IN A PAPER MACHINE OR IN A PAPER FINISHING MACHINE

FIELD OF THE INVENTION

The invention concerns a method for detecting contamination and/or damage in a face running through a nip or nips in a paper machine or in a paper finishing machine, such as a calender or a coating device, in which method vibrations formed in connection with constructions of the machine are detected and processed.

BACKGROUND OF THE INVENTION

The present invention is generally related to both paper machines and paper finishing machines, such as calenders and coating devices, used in manufacture of paper. In these machines, various press nips are employed, in the press section of the paper machine press nips that remove water and/or equalize the web, in calenders calendering nips, and in coating devices coating nips, in which the coating agent is transferred onto the web.

The scope of the invention also includes so-called extended-nip presses, at which the hose roll face or equivalent that runs through the press zone, which press zone is longer than in a normal roll nip, and/or the transfer belt face which runs through the extended-nip zone and which transfers the web further is/are monitored.

The faces of said rolls and the faces of felts and bands running through the nips are susceptible of contamination and damage. As is known from the prior art, said faces are conditioned and cleaned, and, in some cases, their cleanliness is also monitored by means of particular methods and apparatuses.

A particularly favourable embodiment of the invention concerns monitoring of the condition of calender rolls, in particular of soft-coated calender rolls, in order to detect any damage in their faces at a sufficiently early stage and, thus, to permit prevention of damage in advance.

As is known from the prior art, calenders comprise two or more hard-faced and/or soft-faced calender rolls, which form a calendering nip or nips with each other, through which nip/nips the paper web to be treated is passed. In particular rolls with soft faces, such as paper rolls or equivalent in supercalenders and rolls provided with soft coatings, in particular polymer coatings, in what is called soft calenders, are susceptible of damage. The reason for the damage is frequently contaminations, such as local fiber strings, which cause a pressure impact when they pass through the nip, which impact loads the soft coating on the calender roll and first causes its heating and, in the long run, a permanent deformation in the coating and damage. Similar deformations and damage also occur in metallic roll faces and in the faces of bands or felts running through nips, as well as in the face of the flexible mantle of a hose roll and/or of a transfer band running through so-called extended-nip zones.

As is known from the prior art, for monitoring the condition of calender rolls, in particular of soft-faced rolls, thermometers traversing in the cross direction of the machine have been used, by whose means the temperature of the coating is monitored. With respect to this technique, reference is made to the U.S. Pat. No. 4,642,164, the monitoring of the temperature described in said patent being a part of the gloss regulation system of a supercalender. In the temperature monitoring application in accordance with said U.S. patent, and also in corresponding other prior-art systems, problems arise from the fact that the resilient roll coating, whose temperature is monitored, is, as a rule, at least to some extent electrically insulating. Thus, in the partly rubbing contact between the web and the coating, quite high charges of static electricity arise in the faces of the roll coating and of the relatively dry paper web. These charges tend to be discharged along the available routes with the lowest resistance. A thermographic camera must often be installed so that it projects from its support construction, in which case said static electric charges find exactly the thermographic camera as the easiest route of discharge, in which connection the sensitive electronic system of the thermographic camera is subjected to quite high voltages, and it must be protected specifically against such voltages.

Even if monitoring of the temperature of the face of a calender roll usually permits detecting of a local raised temperature resulting from an excessive load applied to the coating or from a local inner non-homogeneity at a sufficiently early stage, this requires installation of quite heavy, expensive and spacious equipment in the vicinity of the roll to be monitored. In particular, congestion of space causes great difficulties in connection with multi-roll treatment devices, at which every device that is not included in the web treatment process proper makes the maintenance and servicing of the device more difficult.

Besides calenders, the environments of application of the present invention also include other finishing devices, such as coating devices and various nips in a paper machine, including press nips that are provided with a felt or felts and/or with a transfer belt and that remove water and/or equalize the web, the following being stated in respect of the prior art related to said press nips.

As is well known, the presses in a paper machine comprise press rolls, which form press nips with each other, through which nips the paper web runs together with a press felt or between press felts. Press rolls with their axle journals and bearing supports are susceptible of vibration, which is increased by the elasticity of the press felts. In press rolls, self-vibration commonly occurs, which is typically in the frequency range of about 20 to about 150. The vibrations cause wave-shaped barring in the press felts and extra wear of the felts. Said barring is adapted to increase the so-called felt-induced vibration of press rolls, whose amplitudes tend to be increased constantly as the wave-shaped barring in the felts becomes deeper.

Attempts have been made to prevent the felt-induced vibration in press rolls thereby that the direction of progress of the felt is varied at suitable intervals by a few angular degrees so that the felt runs over spreader, tensioning and alignment rolls in slightly varying positions. Said varying of the direction of progress means that the felt loop runs in a slightly oblique position, i.e. the length of one of its edges is slightly larger than the length of the opposite edge.

In respect of the prior art related to the press applications of the present invention, reference is made, by way of example, to the paper in *Tappi Journal*, July 1987, pp. 49 to 54, by Yvon Phil Gagnon, "Low-frequency vibration analysis of paper machine presses using displacement transducers and the synchronous time-averaging method".

Further, with respect to press section applications of the present invention, reference is made to the current assignee's U.S. Pat. No. 5,403,447. In said patent, a system is described in the press section of a paper machine for monitoring and controlling the running of the press felts, which press felts are controlled by means of rolls, whose axial direction has been arranged to be varied by means of an actuator for the purpose of controlling the running of the press felts. This system includes detector devices, by whose means the alignment of the felt or felts is detected, as well as vibration detectors, by whose means vibrations of the press rolls and/or of related parts are detected. The system includes a computer or an equivalent logic unit, to which the monitoring signals are fed from said detectors. The computer or equivalent has been programmed to analyze detector data in particular in order to detect felt-induced vibrations. By means of the control system connected to it, the computer regulates the actuators of the guide rolls that control the running of the felts so that, when the vibration level of the press rolls rises beyond preset limits, the alignment of the guide roll or guide rolls of the felt that causes the vibration is altered until an acceptable level of vibration and/or a level of vibration as low as possible is found.

By means of the arrangements in accordance with the prior art coming out from the above cited papers, it is possible to detect vibrations arising from asymmetry of the construction of the press rolls only, and by means of the system U.S. Pat. No. 5,403,447 it is also possible to locate the press felt that is the reason for the vibrations. By means of said arrangements, it is, however, not possible to monitor the impurities and structural damage in the faces of the felts running over the rolls and through the press nips, and, by means of the prior-art arrangements, it is not possible to control the conditioning operations so that they are applied efficiently exactly in the area of the impurities.

OBJECTS AND SUMMARY OF THE INVENTION

The object of the present invention is to provide a method and a device by whose means contamination and/or damage in faces of rolls that form a nip or nips and/or in faces of fabrics and/or bands that run trough nips can be monitored efficiently and by means of relatively simple devices that require little space.

It is a further object of the invention to provide a method and a device in which the operations to be controlled based on the monitoring of the face running through the nip can be arranged to be so quick that, as a rule, permanent substantial damage does not have time to be produced in the face concerned before cleaning operations or equivalent have been started.

It is a further object of the invention to provide a method and a device by means of whose application the cleaning of the face running through the nip can be applied sufficiently precisely expressly to the area that has been noticed to be contaminated, whereby economies can be obtained in respect of the medium and the energy used for the cleaning. In some cases, owing to the present invention, the cleaning equipment can be dimensioned so that its capacity is lower than in the prior art.

In view of achieving the objectives stated above and those that will come out later, the method in accordance with the invention is mainly characterized in that said vibrations are detected by means of at least two detectors, and that, based on the point of time of detecting of the vibrations detected by means of said detectors, the location of the damage and/or contamination on the face to be monitored is determined.

By means of the system of the present invention, vibrations of the faces to be monitored are, in a way, "listened to" and, to the necessary extent, the site of origin of the vibrations is located so that efficient action can be taken sufficiently quickly in order to eliminate the cause of the vibration and/or to prevent further damage.

In calender applications of the present invention, it has been possible to eliminate the problems discussed above by abandoning direct measurement of the surface temperature of the roll, by indirectly monitoring local impurities on rolls and changes in geometry on the basis of vibrations produced by them.

Advantages of the present invention, in particular of its calender applications, as compared with the prior-art procedure, are the following:

- The invention permits monitoring of the rolls so that, in the area of the roll frame, it is unnecessary to construct a measurement equipment provided with a separate support construction, in which case considerable economies of space are obtained.
- The invention also permits locating of an area that causes a disturbance by means of relatively simple devices and algorithms.
- The invention can be connected as a part of the general system of monitoring of the condition of the calender, and the invention can utilize the assemblies of detectors already installed in the area of bearings for the purpose of monitoring the condition of bearings, or, alternatively, the detectors installed in order to carry out the present invention in view of monitoring the condition of the roll face can also be utilized for predicting and/or monitoring of bearing damage.
- The invention is not confirmed to monitoring of disturbance arising from changes in temperature related to local surface temperatures on the rolls alone, but the system of the present invention already reacts at such an earlier stage in which a contamination has adhered to the roll face which would later additionally cause a locally raised temperature.
- Further, the invention is suitable for monitoring of contamination or starting damaging of any coated or non-coated nip roll whatsoever (nip rolls in a film-transfer coating device, press rolls in a paper machine, rolls in a machine calender), because the invention reacts to geometric changes in the face to be monitored and not to changes in temperature.
- Further, it can be considered to be an advantage of the invention as compared with a thermographic camera that the system of the invention constantly monitors the portion of the roll across the entire width of the treatment nip and locates the cause of disturbance preferably both in the axial direction of the roll and in a vertical cross section of the roll in the direction of its circumference.

When the system in accordance with the invention is employed for monitoring of a soft-faced roll face in a soft calender or an equivalent supercalender,. roll damage arising from contaminations can be prevented more efficiently than in the prior art, because the impurities can be located sufficiently precisely, and action can be taken to eliminate such impurities.

When the monitoring system of the invention is used in a calender with several nips, for example in a supercalender, all the rolls in the calender, or at least the rolls that are particularly susceptible of surface damage, in particular soft-faced rolls, are provided with a detector system in accordance with the invention, in which case the source of unusual vibrations can be located exactly at a contaminated and/or damaged roll so that it is possible to start eliminating the contaminations or to replace the damaged part so that further damage and production losses are avoided.

BRIEF DESCRIPTION OF THE DRAWINGS

In the following, the invention will be described in detail with reference to some exemplifying embodiments of the invention illustrated schematically in the figures in the accompanying drawing, the invention being by no means strictly confined to the details of said embodiments.

DETAILED DESCRIPTION OF THE PREFERRED EMBODIMENTS

Figure 1:
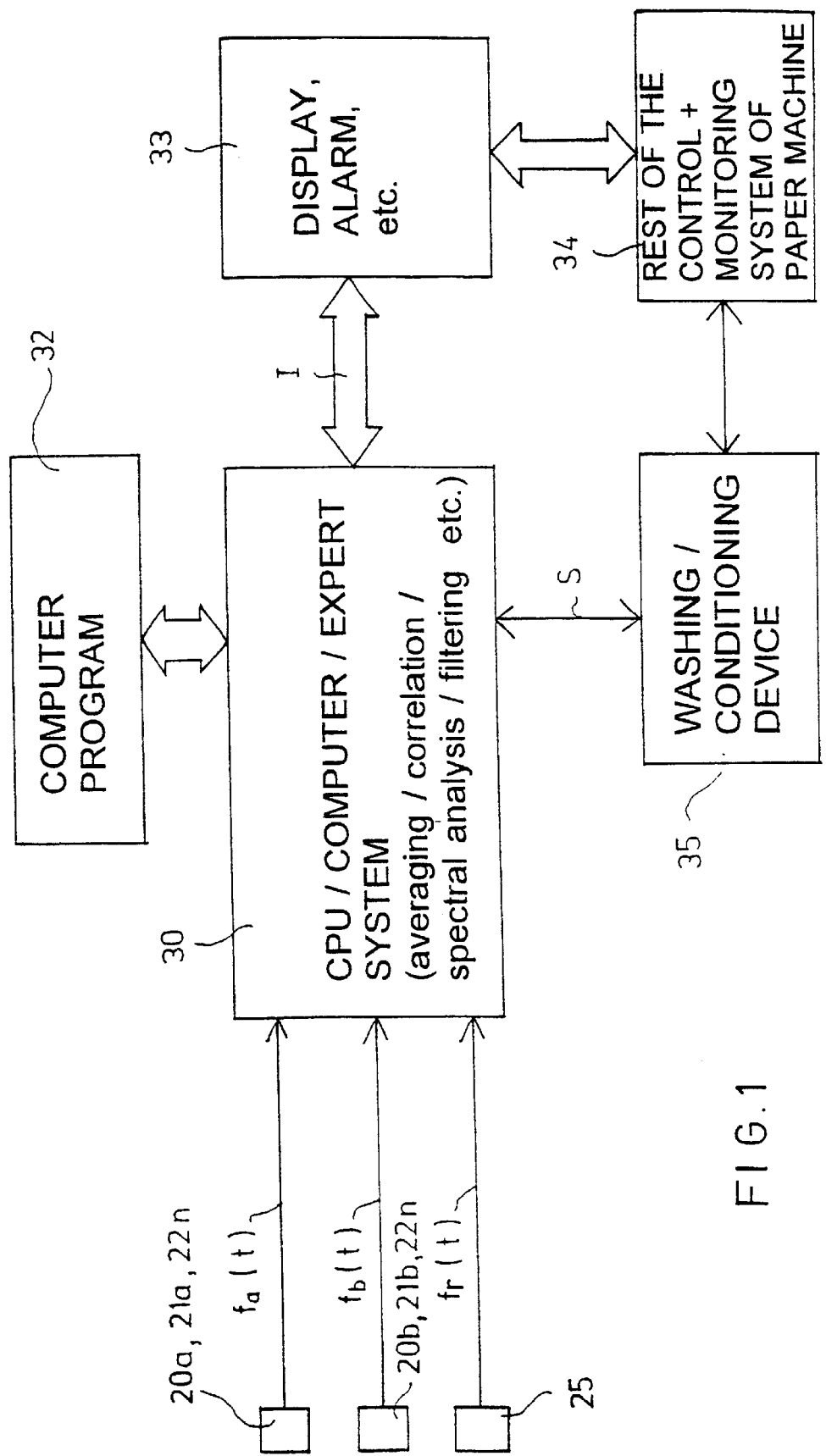
FIG. 1 shows a simplified block diagram illustrating the monitoring system in accordance with the invention.

To begin with, reference being made to FIG. 2, a highly simplified exemplifying embodiment will be described as an environment of application of the invention, which is a soft calender. The roll 10 in the soft calender, which roll is provided with a soft coating 11, for example a polymer coating, forms a calendering nip N with a lower roll 12 provided with a hard face 12'. The lower roll 12 is, for example, a chilled roll. The paper web to be calendered (not shown) is passed through the calendering nip N in a way in itself known. The axle journals 13a and 13b of the calender rolls 10 and 12 have been mounted on support of the bearing housings 14a and 14b. In a way in itself known; the bearing supports 14a, 14b are supported on frame constructions, which are not shown. Of the calender rolls 10 and 12, in connection with the metal mantle of one or both of the rolls, vibration detectors 21a and 21b have been fitted. In addition to that, or alternatively, in connection with one or both of the bearing supports 14a,14b, vibration detectors 20a,20b have been fitted. By means of said pairs of detectors 20a,20b and/or 21a,21b, based on mechanical vibrations and on their locating and analyzing, the condition and purity of the faces 11 and/or 12' of the calender rolls 10,12 are monitored. The invention is particularly well suited for monitoring of the condition and/or purity of a soft coating 11, such as a polymer coating, and for advance prevention of damage. In some calender applications, the soft coating 11 on a roll 10 can be substituted for by a corresponding fiber-reinforced band passing over the roll 10 and through the nip N. By means of detectors 20a,20b fitted at the bearing supports 14a,14b, it is also possible to monitor the condition of the bearings in a way in itself known on the basis of vibration measurements, and this monitoring of the condition can be integrated in the units 30,32,33,34 to be described in relation to FIG. 1.

In the following, with reference to FIG. 1, an exemplifying embodiment of a monitoring system in accordance with the invention will be described. From the pairs of vibration detectors 20a,20b and/or 21a,21b shown in FIG. 2, the signals $f_a(t)$ and $f_b(t)$ are obtained, which are passed to the unit 30. Also, to the unit 30, a signal $f_r(t)$ is passed from the impulse detector 25 placed in connection with the calender roll 10 and/or 12, which signal is formed, for example, out of a short voltage pulse coming on each revolution of the roll, the cycle time T of said pulse illustrating the circumferential speed of the rolls 10,12; 15. In the unit 30, it is also possible to carry out spectral analysis of the signals $f_a(t)$ and $f_b(t)$, for example, by means of Fourier analyzers in themselves known. In this way, in addition to locating the disturbance, it is also possible to draw conclusions concerning the nature and the degree of seriousness of the disturbance. The signal $f_r(t)$ can be used for synchronization of the measurements and for measurement of the speed of rotation of the rolls 10,12 in the monitoring system in accordance with the invention, which will be described in more detail later.

The vibration detectors 20,21 can be, for example, piezo-electric detectors, acceleration or transition detectors, or strain gauge detectors. By means of these detectors 20,21, pressure impacts of quite a high frequency, arising, for example, from impurities $M_1$ and $M_2$, in the set of calender rolls or in a corresponding face to be monitored, such as the face of a transfer belt or a press felt, are measured. Said pressure impacts produce mechanical vibrations present as a longitudinal wave movement, the substantial energy of said vibrations being, as a rule, in the sound frequency range. Besides by impurities, for example local fiber strings $M_1,M_2$, vibrations can also be caused by damage in the coatings on the rolls 10,12, which damage is present as local areas of discontinuity or as deformations in the roll 10,12 faces 11,12', in particular in a soft coating 11 susceptible of damage.

The signals $f_a(t)$ and $f_b(t)$ detected by said pairs of detectors 20a,20b and 21a,21b are averaged in the unit 30, in which, moreover, the phase difference $\phi$ between the signals $f_a(t)$ and $f_b(t)$ is measured. This phase difference $\phi$ is illustrated, for example, by the difference $\Delta t$ between the travel times of the vibrations, which is directly proportional to $\phi$. The difference in time $\Delta t$ is, with the denotations of FIG. 2 and measured with the pair of vibration detectors 21a and 21b, in respect of the fiber strings $M_1$ and $M_2$, as follows: $\Delta t = X_b - X_a/c$, wherein c is the speed of propagation of the vibrations in the rolls 10 and 12. A corresponding difference $\Delta t$ between the travel times can be detected by means of the pair of detectors 20a,20b. Based on the difference $\Delta t$ between the travel times described above, the locations of the fiber strings $M_1$ and $M_2$ in the axial direction X of the rolls 10 and 12 can be determined.

Figure 5:
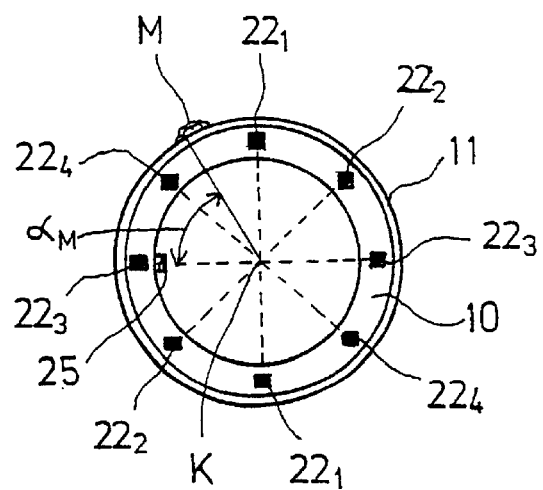
FIG. 5 is a sectional view taken along the line V—V in FIG. 4, i.e. showing fitting of pairs of vibration detectors in connection with a calender roll as shown in FIG. 4.

By means of the signal $f_r(t)$ of the pulse detector 25, with the denotations of FIG. 5, it is possible to determine the phase angle $\alpha_m$ at which the fiber string M is placed from the reference plane determined by the impulse detector 25, in which reference plane the central axis K of the roll is placed. Said angle coordinate $\alpha$ can be determined on the basis of the following equation:

$$\alpha_m = \frac{360° \cdot Tr}{T}$$

wherein Tr=time of delay of the detecting of the vibration caused by the fiber string, and T=cycle time of revolution of the roll.

The definition given above is based on the fact that the speed c of propagation of vibrations in the metal parts of the rolls 10,12;15 is considerably higher than $v_k$=circumferential speed of the rolls, ($c >> v_k$). Thus, it is possible to determine both coordinates $\alpha_m, X_m$ of the fiber strings $M_1, M_2; M$, i.e. the coordinate $X_m$ in the axial direction of the roll, and the angle coordinate $\alpha_m$ perpendicular to same.

Figure 2:
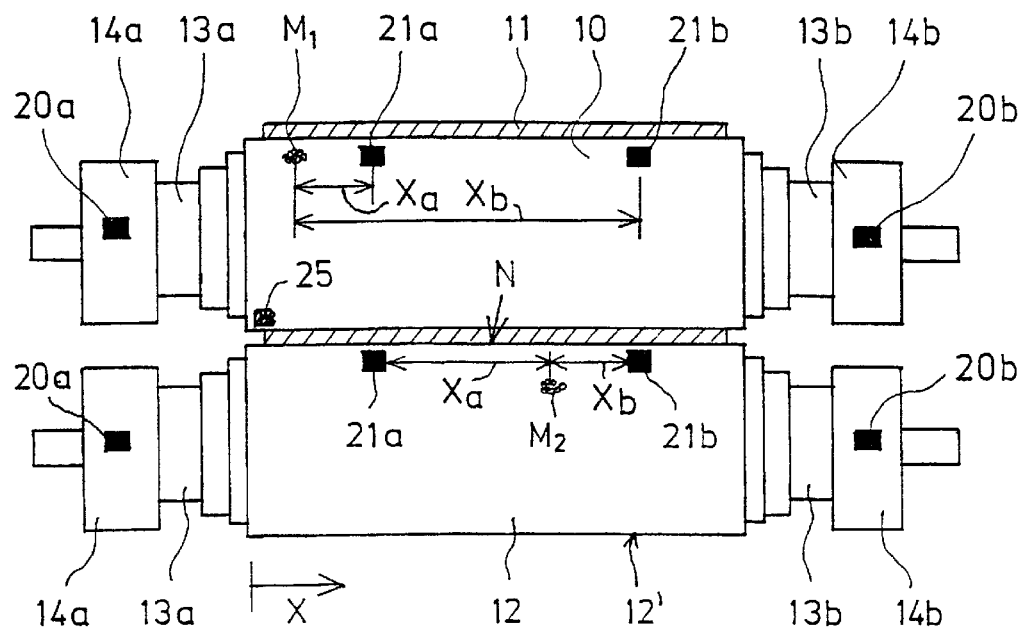
FIG. 2 is a side view illustrating application of the invention to a what is called soft calender.

In the unit 30 shown in FIG. 1, the signals $f_a(t)$ and $f_b(t)$ are averaged, and their phase difference $\phi$ is measured. In the measurement of the phase difference $\phi$, it is also possible to employ the technique of correlation of the signals $f_a(t)$ and $f_b(t)$. In addition to measurement of the phase difference $\phi$, in the unit 30, it is also possible to carry out spectral analysis of the signals $f_a(t)$ and $f_b(t)$, and on the basis of said analysis, it is possible to draw conclusions concerning the nature of the disturbance. The unit 30 can include a processor (CPU) or a computer, whose operation is controlled by a computer program 32 prepared for the purpose. From the unit 30, information I is received, which is passed to the display monitor 33, which displays the appropriate display data for the operation supervisor and possible alarms, if any. Further, based on a signal s received from said unit 30, the devices 35 of cleaning and conditioning of the calender rolls, press rolls, press felts or equivalent can be controlled so that the cleaning operations, for example water or steam jets, are applied in the axial direction of the rolls 10,12,15 expressly to the locations of the impurities $M; M_1, M_2$ (coordinate $X_m$), and in this way the cleaning can be made more efficient and such that it consumes less cleaning medium and energy. Further, the unit 30 can be connected, preferably interactively, with the rest of the control and monitoring system 34 of the paper machine or finishing machine so as to operate synergically together with said system.

In the method of the present invention, the measurement signals can be synchronized by means of the speed of rotation of the rolls 10,12,15, which is obtained by means of the signal $f_r(t)$ and by means of the impulse detector 25. The system in accordance with the invention can operate, for example, so that, when the detector 25 by-passes the trigger point and gives an impulse, the measurement of vibration described above is started, the time used for a cycle of said measurement being invariable. After the cycle of measurement, the next triggering of the detector 25 is waited for, and a new cycle of measurement is started. These measurement cycles of invariable length are stored as a sufficient number, and the average values of the measurement signals $f_a(t), f_b(t)$ are computed. The measurement of the measurement signals $f_a(t)$ and $f_b(t)$ and of the synchronization signal $f_r(t)$ can also be carried out continuously. for example for a period of about 1 minute, after which the program 32 carries out the computing of a synchronized time average.

The pressure impacts arising from local impurities, such as fiber strings M, and the signals $f_a(t)$ and $f_b(t)$ detected from same are of relatively high frequency. Since vibrations arising, e.g., from unbalance of rolls and from barring of press felts are at a considerably lower frequency, they can be filtered off by means of high-pass filters in the unit 30 so that they do not interfere with the measurements in accordance with the invention. By employing means in themselves known in the processing of the signals, such as band-pass filtering or correlation technique, it is possible to reduce the effects of the "noise" interfering with the measurements in accordance with the present invention.

Even though, above, it has been described that the coordinates $X_m, \alpha_m$ of location of impurities M on the mantles of the rolls 10,12,15 are measured both in the axial direction and in the circumferential direction, the invention can, of course, also be applied so that just one of the coordinates $X_m, \alpha_m$ is detected. For example, it is possible to detect the coordinate $X_m$ only, on whose basis the jets that clean the roll faces can be controlled exactly to said location $X_m$ in the axial direction of the roll 10,12; 15. The cleaning water jets or equivalent can also be "pulsated" so that they apply a jet either at the location $X_m$ or across the entire width of the machine or in a certain area exactly to the location of the angle coordinate $\alpha_m$.

As said devices 35 for cleaning and/or conditioning of the roll face or of the face of a corresponding band or felt, it is possible to use, for example, nozzle devices of the sort described in the U.S. Pat. No. 5,603,775, which traverse in the axial direction of the roll and which spray a cleaning medium.

Figure 3:
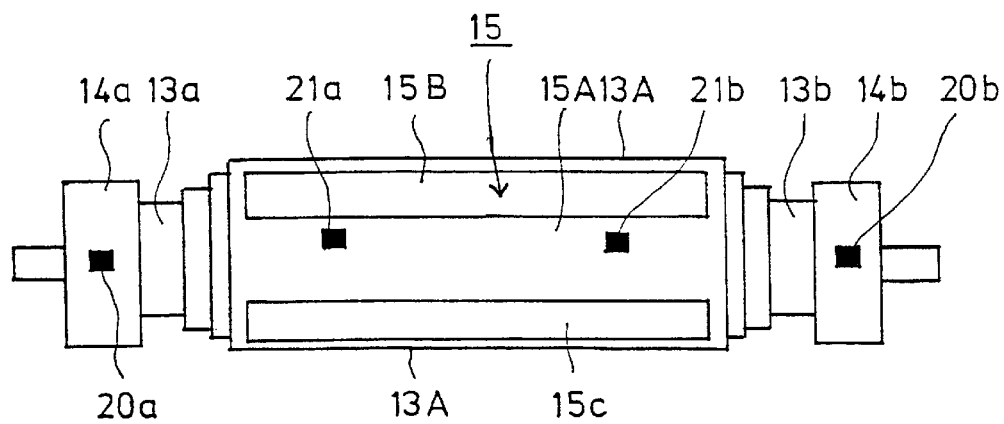
FIG. 3 is a schematic side view illustrating the fitting of the vibration detectors employed in the invention at a variable-crown roll.

The detectors 20,21 that measure vibrations can be placed in different ways at different rolls. FIG. 3 illustrates the fitting of a pair of vibration detectors 21a,21b in connection with the stationary central axle 15A of an adjustable-crown roll 15. The adjustable-crown roll 15 includes a roll mantle 13A revolving on support of axle journals 13a,13b, and in the interior of the roll mantle there are crown variation means in themselves known, which are supported on the stationary central axle 15A. which operate by means of a hydraulic pressure medium, and which are illustrated in FIG. 3 schematically as the parts 15B and 15C.

Figure 4:
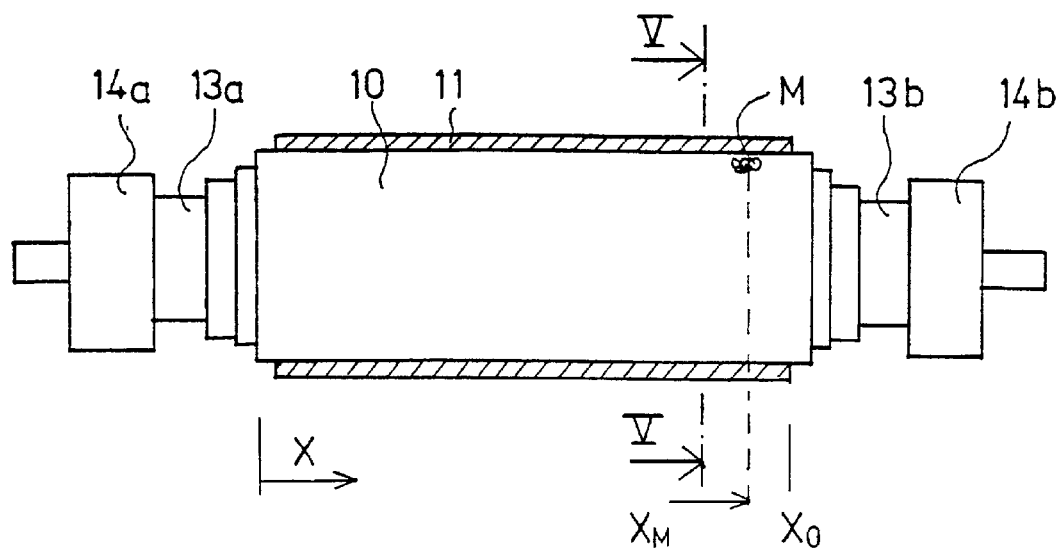
FIG. 4 is a schematic side view of a soft-calender roll that is provided with pairs of strain gauge detectors in view of application of the present invention.

When strain gauges are used as the vibration detectors 20,21, they can be fitted, in the way shown in FIGS. 4 and 5, in pairs either at an end or at the ends of the metal mantle of the roll 10 or on the inside face of the roll mantle. As is shown in FIG. 5, the detectors of the strain gauge detector pairs $22_1, 22_2, 22_3, 22_4$ have been fitted one opposite to the other as uniformly spaced at an end of the roll mantle. Out of the signals of the pairs of detectors $22_n$ difference signals are formed in a way in itself known, e.g. by means of a bridge connection, on the basis of which signals vibrations of rolls are detected and the locations of the fiber strings M both in the axial direction X and in the circumferential direction (coordinate $\alpha$) are established. Since, depending on the location of the source of disturbance, such as a fiber string M, different detectors $22_n$ receive the vibration signals at different times, based on these differences in time it is possible to determine the coordinate $X_m$ of the disturbance. The angle coordinate $\alpha_m$ is determined in compliance with the above on the basis of a pulse detected by means of the detector 25.

When detectors 21a,21b fitted on revolving mantles of calender rolls 10,12 or equivalent or on other revolving parts are employed in stead of, or in addition to, stationary vibration detectors 20a,20b, the transfer of data from the mobile detectors can be arranged in ways in themselves known. For the transfer of measurement signals $f_a(t), f_b(t)$ and $f_r(t)$ from revolving rolls 10,12,15, a number of different solutions are known from the prior art, which can be applied in connection with the present invention. These prior-art solutions include various glide rings and transfer of signals by the radio. Glide rings are possible, but they are often susceptible of disturbance, and typically they require an abundance of space on the roll axles. For wireless transfer of signals, radio apparatuses are available commercially. The prior-art solutions related to said transfer of signal are not described in more detail in this connection, but in their respect, reference is made, by way of example, to the Patent Application EP-A1-0075620 and to the current assignee's FI Patent 92,771.

Even though, above, the invention has been described in connection with an environment of application in which there is just one calendering nip N, it is understood that the invention can also be applied to calenders and presses in which there are several nips, for example in supercalenders in which there is a great number of nips. In such a case, a sufficient number of detectors 20,21,25 must also be fitted in order that a damage could be located with sufficient precision.

In the following, the patent claims will be given, and the various details of the invention can show variation within the scope of the inventive idea defined in said claims and differ from what has been stated above by way of example only.

What is claimed is:

1. A method for detecting contamination and/or damage in a face (11,12') of a roll running through a nip (N) or nips in a calender, comprising the steps of:

detecting rotational vibrations in said calender caused by contamination or damage to said face during operation or construction of the machine by means of at least first and second detectors (20,21,25) structured and arranged on at least one of said face and a bearing housing supporting said calender roll, said at least a first detector being adapted to measure said vibrations and generate a first time based vibration signal $f_a(t)$ and said at least a second detector being adapted to measure said vibrations and generate a second time based vibration signal $f_b(t)$, and determining the location of said damage and/or contamination (M:M$_1$,M$_2$) on said face to be monitored (11, 12') based on said first time based vibration signal $f_a(t)$ and said second time based vibration signal $f_b(t)$.

2. A method as claimed in claim 1, characterized in that, in the method, vibrations in the frame of a roll (10, 12, 15) that forms a nip (N) and/or in the bearings (14a, 14b) of the roll are detected by means of at least one pair of detectors (20a, 20b, 21b; 22$_n$), and that the locations of the source of disturbance in an axial direction (X) of said roll is determined based on a phase difference ($\phi$) of said first time based vibration signal $f_a(t)$ and said second time based vibration signal $f_b(t)$.

3. A method as claimed in claim 2, characterized in that, by means of the detectors (20a, 20b) placed in connection with the bearings (14a, 14b) of the rolls to be monitored, additionally the condition of said bearings is monitored.

4. A method as claimed in claim 1, characterized in that the location of the source of disturbance (M;M$_1$,M$_2$) in the circumferential or machine direction of the face (11, 12') to be monitored is determined by making use of an impulse detector (25) for recording the revolutions of the face (11,12') to be monitored and generating a time based impulse signal $f_r(t)$ therefrom.

5. A method as claimed in claim 2, characterized in that, in the method, by means of a high-pass filter and/or by means of a band-pass filter, the interfering signals placed outside the measurement window and arising from unbalance of rolls (10,12,15), fabrics and/or bands and from other vibrations are separated from the signals ($f_a(t),f_b(t)$) detected by means of the vibration detectors (10,21).

6. A method as claimed in claim 4, characterized in that, in the method, a certain amount of measurement signals are collected in the memory, which signals are formed as an average value, and, based on the signals thus obtained, the determination of at least one, preferably two, coordinates ($X_m$, $\alpha_m$) of the source (M;M$_1$,M$_2$) of disturbance on the face (11,12') to be monitored is carried out.

7. A method as claimed in claim 4, characterized in that, in the method, the vibration signals ($f_a(t),f_b(t)$) and the signal ($f_r(t)$) that indicates the by-passing and the speed of the reference point on the face to be monitored are passed to a unit (30) or to a computer, which is provided with a program (32) that controls the measurement and analyzes the measurement results, and that from said unit (30) or equivalent the measurement results are passed to display and/or alarm means (33).

8. A method as claimed in claim 6, characterized in that, based on the coordinates of location ($X_m,\alpha_m$) of the sources of disturbance, such as the impurities (M;M$_1$,M$_2$), the devices (35) that clean the face to be monitored are controlled so that they apply the cleaning operation to the area of the impurities.

9. A method as claimed in claim 2, characterized in that the signals ($f_a(t),f_b(t)$) received from the vibration detectors are subjected to a spectral analysis, on whose basis conclusions are drawn concerning the nature of the disturbance and/or effects of outside sources of disturbance are reduced.

10. A method as claimed in claim 1, characterized in that the method is applied to monitoring of damage and/or contamination in a soft coating (11) on a soft calender roll, such as a roll of a soft calender or supercalender.

11. A method for detecting contamination on or damage to a web-contacting face of a roll running through a calender defining a nip, comprising the steps of:

measuring rotational vibrations of the web-contacting face over a period of time by means of a at least a first and second detector arranged on at least one of said web-contacting face and a bearing housing supporting said roll, wherein said vibrations are the result of at least one of a deposition of contamination and damage of said face during operation or construction of the machine;

generating a first time based vibration signal $f_a(t)$ based upon said measurements of said first detector and generating a second time based vibration signal $f_b(t)$ based upon the measurements of said second detector;

determining the location of the contamination on or damage to the web-contacting face based on said first time based vibration signal $f_a(t)$ and said second time based vibration signal $f_a(t)$.

12. The method as in claim 11, fir comprising the step of:

determining the location of the contamination or damage to the web-contacting face in an axial direction of the web-contacting face based upon a phase difference between said first time based vibration signal $f_a(t)$ and said second time based vibration signal $f_a(t)$.

13. The method as claimed in claim 12, further comprising:

recording revolutions of the web-contacting face by means of an impulse detector which detects an impulse and generating a time based impulse signal $f_r(t)$ therefrom.

14. The method as in claim 11, further comprising the step of:

separating interfering signals placed outside a measurement window and arising from other vibrations from the vibrations detected by any of the detectors.

15. The method as in claim 12, further comprising the steps of:

computing at least one set of coordinates constituting the location of the contamination on or damage to the web-contacting face based on an average value of the locations of the contamination on or damage to the axial direction of the web-contacting face and the contamination on or damage to the circumferential direction of the web-contacting face; and storing the at least one set of coordinates in a memory.

16. The method as in claim 13, further comprising the steps of:

passing the vibrations detected by the at least one pair of detectors and the impulse detected by the impulse detector to a computer which includes a program that controls measurement and analyzes the measurement to obtain measurement results; and passing the measurement results to at least one of a display or alarm means.

17. The method of claim 15, further comprising the step of:

cleaning the location of the contamination on or damage to the web-contacting face based on the at least one set of coordinates.

18. The method as in claim 12, further comprising the steps of:

analyzing the vibrations detected by the detectors by means of spectral analysis; and determining the nature of the contamination on or damage to the web-contacting face such that the effects of the contamination or damage may be reduced based on the nature of the contamination or damage.

19. The method as in claim 11, wherein the web-contacting face comprises the face of a soft coating arranged in association with the roll.

20. In a calender having a frame, at least one roll having web-contacting face defined in connection therewith, and bearing for supporting ends of each of the at least one roll on the frame, the improvement comprising:

at least a first and second detector arranged on at least one of said web-contacting face and said bearings for detecting rotational vibrations of the web-contacting face over a period of time, wherein said bibrations are the result of at least one of a deposition of contamination and damage to said face during operation or construction of said machine, and wherein said first detector is structured and arranged to generate a first time based bibration signal $f_a(t)$ and said second detector is structured and arranged to generate a second time based bibration signal $f_b(t)$ such that a location of contamination on or damage to the web-contacting face is able to be detected based on the first and second time based vibration signals.

* * * * *